April 30, 1963 E. C. SMITH 3,088,061
SHEET THICKNESS SENSING SERVOMECHANISM
Filed May 6, 1959 4 Sheets-Sheet 1

INVENTOR.
EDWARD C. SMITH
BY Charles A. Blank
ATTORNEY

INVENTOR.
EDWARD C. SMITH
BY Charles A. Black
ATTORNEY

United States Patent Office 3,088,061
Patented Apr. 30, 1963

3,088,061
SHEET THICKNESS SENSING SERVOMECHANISM
Edward C. Smith, Ramsey, N.J., assignor to United States Rubber Company, New York, N.Y., a corporation of New Jersey
Filed May 6, 1959, Ser. No. 811,397
30 Claims. (Cl. 318—28)

This invention relates to servomechanisms with negative velocity feed-back and, more particularly, to a type of pneumatically actuated positioning servomechanism in which a control means acts to control a motive means which positions a movable member at a desired position, the control means being actuated by a pneumatic pressure representative of the instantaneous position and velocity of the movable member.

The prior art discloses devices having a purpose similar to that of the present invention, and in some respects resembling the devices of the present invention in structure and operation. The present invention pertains to the incorporation of negative velocity feed-back in a pneumatically actuated servomechanism, with resultant greatly improved operational characteristics; to the means used to incorporate the negative velocity feed-back; and to the adaptation and application of such servomechanisms to a variety of purposes. The term "negative velocity feed-back," as used in this application, refers to means whereby the above-mentioned pneumatic pressure which actuates the control means is modulated in accordance with the velocity of the movable member, in such a sense as to counteract the motion of the member. By the use of negative velocity feed-back, it is possible to obtain desirable operational characteristics of high sensitivity, accuracy, and speed of response, combined with stability, to a degree heretofore unknown in devices of the type under consideration.

Devices embodying my invention are useful for a number of purposes, such as for continuously indicating or recording the distance of a material surface from a reference point, and more particularly for continuously indicating or recording the thickness of a moving sheet of material, for example a sheet of rubber or other material formed by a machine such as a calender, an extruder, a spreader, etc.

My invention is also useful in servomechanisms for positioning a member relative to a material surface, and for controlling the thickness of a moving sheet of material formed by a machine of the type mentioned. Other useful applications of my invention, and its advantages over devices previously used, will become evident in the following.

It is therefore an object of the present invention to provide a pneumatically actuated servomechanism with negative velocity feed-back, having desired operational characteristics of high sensitivity, accuracy, speed of response, and stability.

It is a further object of the invention to provide a pneumatically actuated servomechanism for positioning a movable member at a desired position, having the above-mentioned desired operational characteristics.

It is another object of the invention to provide a new and improved device for indicating the distance of a material surface from a reference point, which has the above-mentioned desired operational characteristics.

It is another object of the invention to provide a new and improved device for indicating the thickness of a moving sheet of stock produced by a calender, which has the above-mentioned desired operational characteristics.

It is another object of the invention to provide a new and improved servomechanism for controlling the thickness of a sheet of stock produced by a calender, which has the above-mentioned desired operational characteristics.

In a particular form of the invention, a device for indicating the distance of a material surface from a reference point comprises a movable nozzle with an orifice adapted to discharge a stream of gas against the material surface, and thereby develop within the nozzle a back pressure of a magnitude dependent upon the distance between the material surface and the orifice. The device also includes mounting means, in fixed spatial relationship to the reference point, upon which the nozzle is so mounted as to be movable relative to the material surface. The device also includes control means primarily actuated by the back pressure within the nozzle, and having an output adapted to reposition the nozzle so as to maintain within the nozzle a substantially constant predetermined back pressure corresponding to a predetermined distance between the surface and the orifice. The device also includes means responsive to the rate of change of position of the nozzle for modifying the back pressure in such a sense as to counteract the motion of the nozzle, thereby providing negative velocity feed back in the device and conferring upon the device desired operational characteristics.

For a better understanding of the present invention, together with other and further objects thereof, reference is made to the following description taken in connection with the accompanying drawings, in which:

FIGURE 8 shows the adaptation of the FIGURE 1 device to an instrument for the indication and recording of pneumatic pressure.

Figure 1:
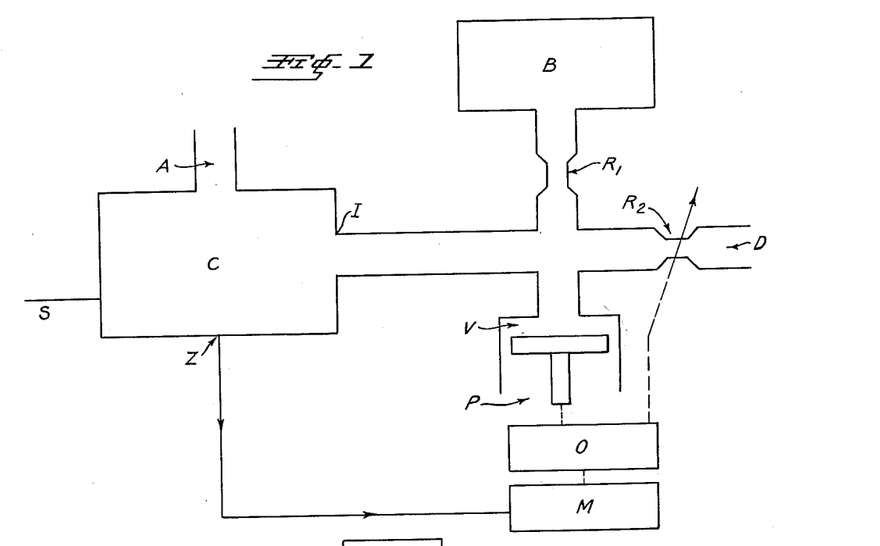
FIGURE 1 represents, in part diagrammatically, a device according to the invention for automatically positioning a movable member at a desired position.

Referring to FIGURE 1, there is shown therein a source B of supply of gas as a closely regulated constant pressure, which discharges gas to the atmosphere at D through a passageway containing a fixed flow resistance $R_1$ and a variable flow resistance $R_2$. The passageway is connected at a point between the two flow resistances $R_1$ and $R_2$ to a chamber V having means P for varying its volume (represented in the figure as a movable piston), and to the controller C at I. $R_1$ has a large resistance compared with $R_2$, so that, under operating conditions, a relatively large pressure drop occurs across $R_1$, and the gas flows through $R_1$ at a substantially constant rate, regardless of the relatively small pressure variations which occur in the region of system between $R_1$ and $R_2$. Thus the pressure in this region, which is applied to the controller C at I, will, in the absence of any change in volume of the chamber V, be determined by the flow of gas at a constant rate through $R_2$, and so will be proportional to the resistance $R_2$. If the volume of V is decreasing, the flow rate through $R_2$ will be increased by an amount equal to the rate of change of volume, and hence the pressure applied at I will be increased as compared with the "stationary" value. The movable member O is moved upwards or downwards by the motor M, which receives power from a source S through the power outlet Z of the controller C. The controller C is also supplied with a control reference pressure, corresponding ot the pressure at I when the movable member is stationary and in the desired position. This control reference pressure may be furnished at an input port, indicated by A in FIGURE 1; or in some cases it may be generated within the controller. Means are provided for varying the resistance $R_2$ in response to changes in position of the movable member O, thereby developing at I a pressure representative of the position of O. The arrangement is such that, as O moves upwards, $R_2$ is increased. Means are also provided for moving the piston P in correspondence with the motion of O, thereby modifying the pressure at I in proportion to the velocity of O.

The operation of the device in FIGURE 1 can best be understood by first considering how it would operate if the volume of the chamber V remained constant, and then considering how this operation is modified when the volume of V is varied as specified above. In the absence of any change in volume of the chamber V, gas flows at a constant rate through the resistance $R_2$, causing a back pressure which depends only on the position of the movable member O. This back pressure is compared in the controller C with the control reference pressure. When the movable member O is at the desired position, these two pressures correspond, and the controller operates to hold the motor M stationary. When the member O is not at the desired position, the two pressures do not correspond, and the controller operates to drive the motor in such a direction as to restore the desired position of the member O; the motor speed is higher, the greater the deviation of the back pressure from correspondence with the control reference pressure. Thus the mechanism operates to maintain the movable member O in the desired position. However, in the absence of negative velocity feed-back as furnished by the chamber V, the accuracy, sensitivity, speed or response, and stability of the device are not satisfactory for many purposes.

Considering now the effect of varying the volume of V, it is apparent that, if O is moving upwards in FIGURE 1 (in response to a decrease in pressure I), the volume is decreasing, and the air flow through $R_2$ is increased, thereby increasing the pressure at I over that corresponding to the existing position of the member O with the member O stationary. Similarly, if O is moving in the opposite direction (i.e. downwards in FIGURE 1), the pressure at I is decreased. The arrangement is such that in both cases the pressure at I is modified in such a sense as to partially counteract the change in pressure which initiated the action of the control means. The pressure change due to the volume change in chamber V is proportional to the velocity of the movable member O. Thus incorporation of the variable-volume chamber V results in negative velocity feed-back.

My invention as illustrated in FIGURE 1 is not limited to any particular type or form of any of the component parts. The controller C and the motor M may be of any types which, by suitable arrangement, can be adapted to cause appropriate motion of the motor M at a rate and in a direction determined by the extent and direction of the deviation of the pneumatic pressure applied at the controller input I from correspondence with the control reference pressure. For example, the controller C may control the power delivered from an electrical source S to an electrical motor M. The means for varying the volume of the chamber V is shown in FIGURE 1, for illustrative purposes, as a movable piston; but it is obvious that other devices, such as liquid displacement piston, a flexibly mounted movable diaphragm, or a bellows-like chamber could be used. The variable flow resistance $R_2$ may take various forms, according to the particular application.

The device of FIGURE 1 can be adapted to a wide variety of useful purposes. By way of illustration, important applications of the device are shown in FIGURES 2–5, which show a device for indicating the thickness of a sheet of material, and in FIGURES 6 and 7 which illustrate the adaptation of the device of FIGURES 2–5 to the control of the thickness of a calendered sheet of rubber or the like.

Figure 2:
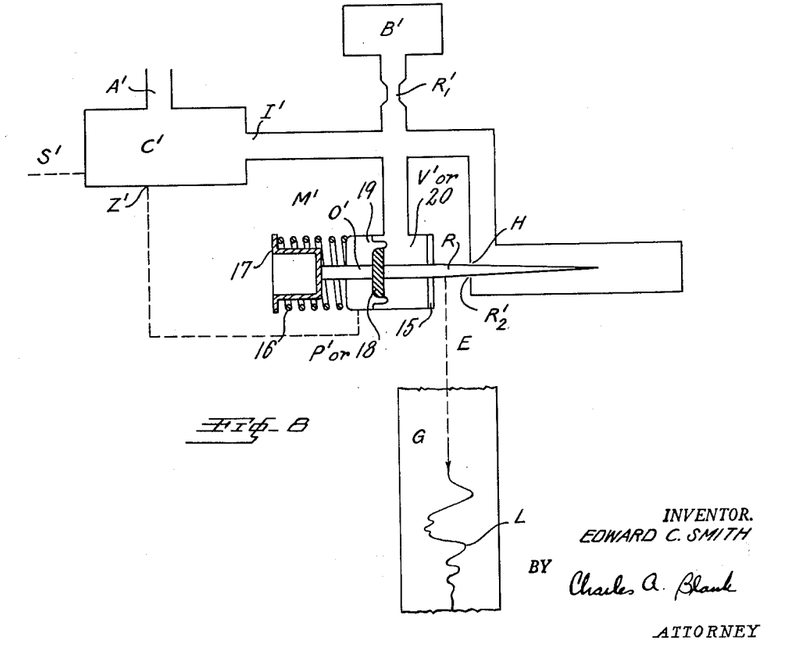
FIGURE 2 is a view, partly in section and partly diagrammatic, of a stock thickness-indicating device constructed in accordance with the invention.
Figures 2, 3:
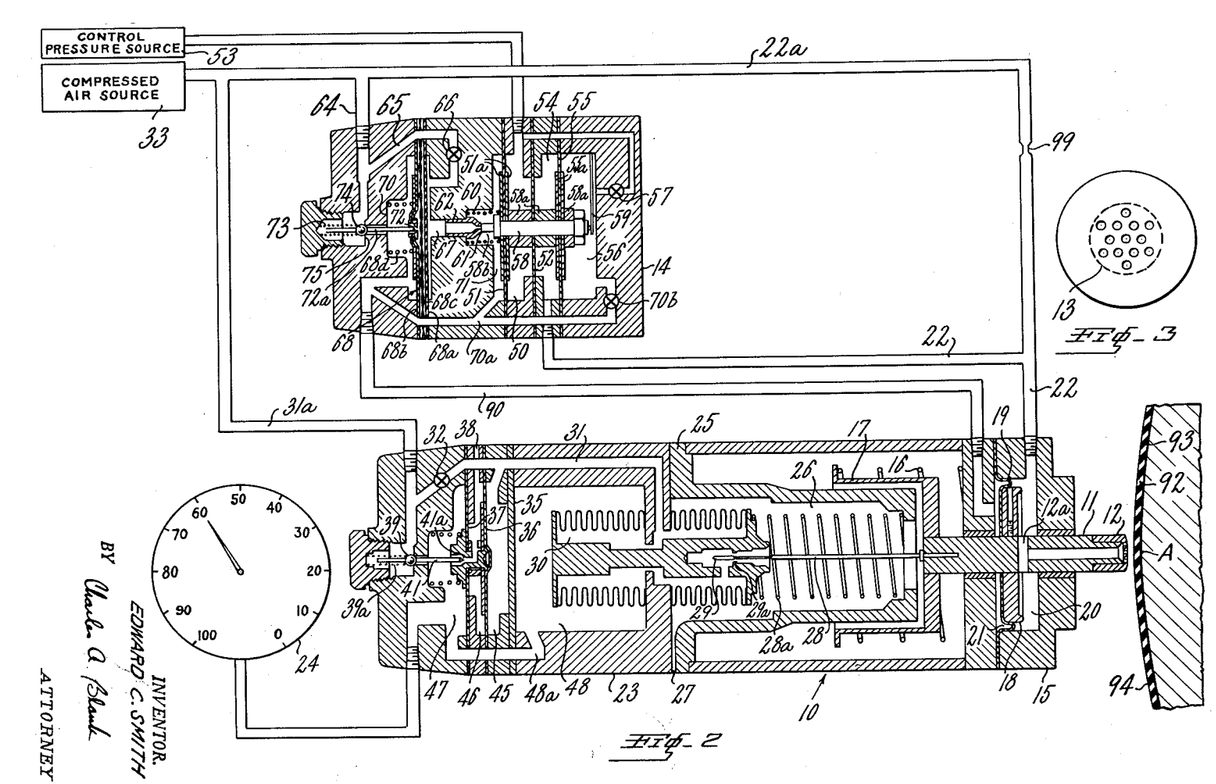
FIGURE 3 is an end view of a preferred nozzle utilized in the FIGURE 2 device.

Referring now more particularly to FIGURE 2 of the drawings, there is represented a device 10 for indicating the distance of the surface 94 of rubber stock 92 from a reference point A at the surface 93 of a calender roll as represented in fragmentary view. The device 10 thus is effective to indicate the thickness of the stock. The device 10 includes movable means for discharging a gas stream against the surface of the stock to develop within the discharging means a back pressure of a magnitude dependent upon the distance between the surface of the stock and the discharging means and upon the velocity of the discharging means. The discharging means comprises a nozzle 11 with an orifice 12 adapted to discharge an air stream supplied from a source of compressed air 33 through line 22a and restriction 99. The nozzle preferably has a multihole flat face 13, represented in FIGURE 3, for discharging a diffuse air stream against the surface of the stock without distorting the surface. The nozzle is slidably movable towards and away from the surface of the calender roll in the plate 15 of the device 10, which is mounted in fixed spatial relationship to the surface of the calender roll, all as more fully explained hereinafter. Thus, the orifice of the nozzle discharging gas against the surface which is at a variable distance from the nozzle constitutes a variable flow resistance, the magnitude of which depends upon the distance from the face 13 of the nozzle to the stock surface.

The thickness-indicating device 10 also includes control means, actuated by the back pressure in the nozzle, and having an output adapted to reposition the nozzle 11 so as to maintain within the nozzle a substantially constant predetermined back pressure corresponding to a predetermined distance between the nozzle face 13 and the surface of the stock. More particularly, the control means includes a pneumatic controller 14 actuated by the back pressure for developing an output pressure adapted to reposition the nozzle. The controller shown is a pneumatic controller which is commercially available from the Moore Products Company, Philadelphia, Pennsylvania. The controller 14 includes a chamber 50 bounded by diaphragms 51 and 52 and connected to an adjustable source 53 of control pressure of suitable magnitude (for example, 3–5 pounds per square inch). The magnitude of this control pressure determines the distance between the nozzle and the stock surface, as will be made clear below. The controller also includes a chamber 54 bounded by diaphragms 52 and 55 and connected to the chamber 20 of the pneumatic motor (described below) by means of line 22. The pressures of the chambers 50 and 54 are balanced when the nozzle 11 is at a predetermined distance, for example, 0.012 inch from the surface of the stock. A chamber 56, bounded by the diaphragm 55 and the outer wall, connects with control pressure source 53, through a restriction 57. The diaphragm assembly consists of the diaphragms 51, 52 and 55, diaphragm stiffening discs 51a and 55a, and spacer rings 58a, all rigidly assembled on member 58 as shown. The assembly is positioned between a leaf spring 59 and a coil spring 60. One end 58b of the member 58 serves as a pilot to open or close the orifice 61 of the pilot valve 62. The air source 33 is connected through a line 64, a passageway 65, and a restriction 66 to a chamber 67 bounded by a diaphragm assembly 68.

The diaphragm assembly 68 comprises a porous inner layer 68c, communicating with the atmosphere, between an impermeable layer 68a adjacent to chamber 67, and an impermeable layer 68c, adjacent to another chamber 70 and having an aperture 72 connecting chamber 70 with porous layer 68c. Aperture 72 is opened or closed by relative motion of diaphragm assembly 68 and valve stem 72a.

Valve stem 72a also carries ball valve 74, which is held in a normally closed position by coil spring 73. When opened by motion of diaphragm 68b acting through valve stem 72a, valve 74 admits air from the source 33 through passageway 64 to chamber 70. The chamber 70 communicates with chamber 71 through passageway 70a, and with chamber 56 through passageway 70a and valve 70b. The pressure in chamber 70 is the output pressure of the controller. Valve 70b controls the proportional band of the controller and may be preset or adjusted to provide, for example, a 12 pound per square inch pressure change in the output in response to a .72 pound per square inch pressure change in the input with a 6% proportional band setting. Restriction 57 is used in conjunction with valve 70b so that the pressure in chamber 56 is intermediate the control reference pressure and the pressure in line 70a.

A pneumatic motor for positioning the nozzle 11 is driven by the output pressure of the controller. The motor comprises a movable member 18 attached to the nozzle 11, and a flexible diaphragm 19 attached to one surface of the movable member 18 for forming one wall of the power chamber 21, of the pneumatic motor. The pressure output of the controller is supplied to chamber 21 by pipe 90. A cup-shaped member 17 attached to the nozzle and a coil spring 16 operating to push the nozzle assembly to the left are included in the means for positioning the nozzle.

The device 10 also includes means responsive to the rate of change of position of the nozzle for providing negative velocity feed-back in the device, thereby conferring upon the device desired operational characteristics, as will be explained more fully hereinafter. This means comprises the chamber 20 in front of the diaphragm 19 and the member 18 of the pneumatic motor. The chamber 20 has a volume which varies with displacements of the diaphragm 19, and the chamber communicates pneumatically with the nozzle through passage 12a. The device 10 also includes a pneumatic connection or air line 22 for applying the pressure developed in the nozzle and the chamber 20 to the controller chamber 54.

The device preferably also includes means associated with the nozzle for visually indicating the gage of the stock. As illustrated in FIGURE 2, this consists of means for developing an output pressure representative of the position of the nozzle relative to the mounting means, and pneumatic means responsive to this output pressure for indicating the position of the nozzle relative to the mounting means, thereby indicating the thickness of the stock. The indicating means shown comprises in part a motion transmitter which is commercially available from Moore Products Company. The motion transmitter comprises a housing 25 enclosing a chamber 26 having a vent 27 to the atmosphere. A shaft 28 is attached to the nozzle 11, and supports a pilot 29 within a valve port 29a in the bellows unit 30, which is connected pneumatically through a passageway 31, a pressure-dropping valve 32, and a line 31a to the source of compressed air 33. Chambers 45, 46 and 47 and 48 of the motion transmitter are separated by a rigid plate 35 and flexible diaphragms 36, 37. The chamber 45 communicates with passageway 31. The chamber 46 has an exhaust vent 38 to the atmosphere. The flow of air into and out of chamber 47 is governed by the position of diaphrams 36 and 37, acting through valve stem 41. Motion of diaphragms 36 and 37 to the left seats stem 41 in valve seat 41a, closing the connection between chamber 47 and chamber 46, and opens valve 39, admitting air from passage 31a to chamber 47 and connecting chamber 48. Motion of diaphragm 36 to the right opens valve 41—41a, allowing air to escape from chamber 47 to chamber 46, and thence to the atmosphere through vent 38, and allows valve 39 to close under the action of spring 39a. The pressure in chamber 47 is the output pressure representative of the position of the nozzle and operates the pressure gage 24, which indicates the gage of the stock. The operation of the motion transmitter is as follows. Movement of the nozzle 11 to the right causes pilot 29 to further obstruct the flow of air from bellows unit 30. The resulting pressure increase in bellows unit 30 and in chamber 45 moves diaphragm 36 to the left, opening valve 39 and thus increasing the pressure in chamber 47 and in connecting chamber 48. The increased pressure in chamber 48 moves the bellows unit 30 to the right against the force exerted by range spring 28a, repositioning port 29a to its original position with respect to pilot 29. Air then escapes from bellows 30 and chamber 45 allowing diaphragm 36 to return to substantially its original equilibrium position. The increase in pressure in chambers 47 and 48, and in the gage 24, is directly proportional to the distance which pilot 29 moves; thus both the pressure and the gage indication are a measure of the gage of the sheet 92.

Figure 4:
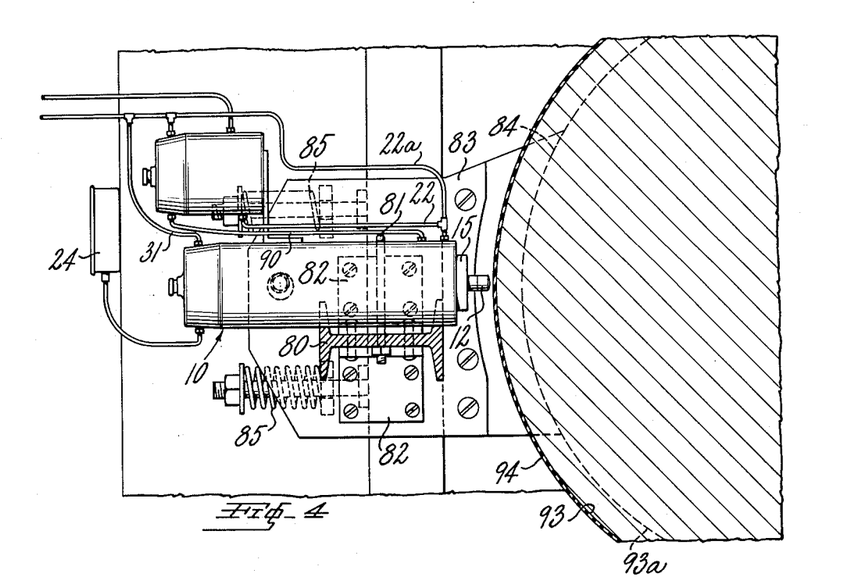
FIGURE 4 is a side view of the FIGURE 2 device and its mount.
Figure 5:
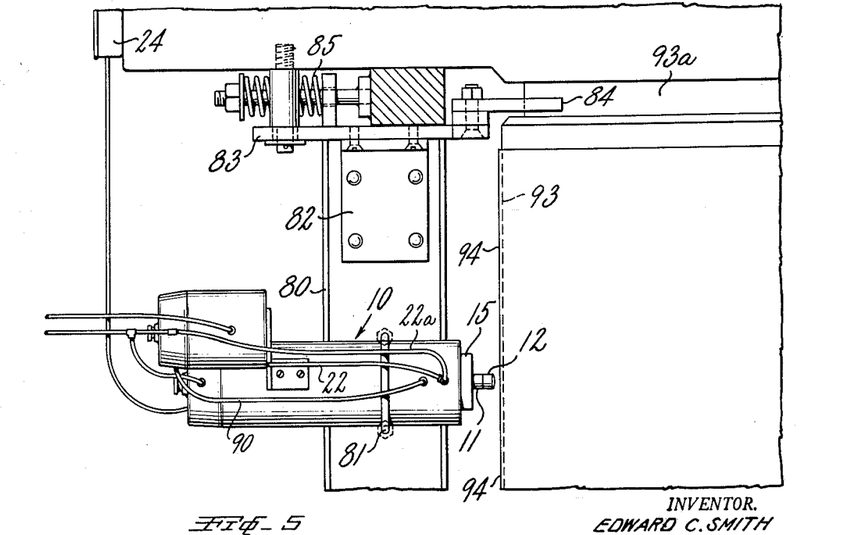
FIGURE 5 is a top view of the FIGURE 2 device and its mount.

Referring now more particularly to FIGURES 4 and 5 of the drawings, the stock thickness indicating device 10 is represented together with its associated mounting means. The mounting means comprises a suitable I-bar 80, having a mounting bracket 81 for the device 10, and attached at each end by suitable brackets 82 to a side mounting plate 83. The mount has at each end a shoe 84 having a curved surface in contact with a surface 93a of the calender roll, and it is maintained in position by means of springs 85. (The surface 93a is preferably on a shoulder turned on the end of the calender roll as shown, to avoid clogging the contact area between 84 and 93a with rubber.) Thus, the body of the device 10 is maintained in fixed spatial relationship with the surface of the calender roll, following any variations of position of the surface of the calender roll due to, for example, displacements of the roll during rotation.

Considering now the operation of the FIGURE 2 device, air at a pressure, for example, of 35 pounds per square inch is supplied from source 33 through the restriction 99, which maintains a substantially constant flow to line 22, and thence to chamber 20 and nozzle 11. The nozzle discharges the air against the surface of the stock, developing a back pressure in the range of, for example, 3–5 pounds per square inch in the chamber 20, which is applied through line 22 to the controller. As will be explained more fully subsequently, the back pressure is compared with the control pressure in the controller, which delivers an output pressure in the range of, for example, 0 to 35 pounds per square inch through line 90 to the chamber 21 of the pneumatic motor. The force thus developed is counteracted by the spring 16 acting against cup-shaped member 17, causing the diaphragm 19, with the attached member 18 and nozzle 11, to assume its rest position at a predetermined distance from the surface of the stock.

As the calender roll rotates and the thickness of the stock varies, the nozzle 11 follows the variations. Asusming that the stock moves away from the nozzle 11 due to a decrease in stock thickness, the back pressure in the nozzle and the chamber 20 drops. This drop in back pressure is applied to chamber 54 of the controller, causing the pilot 58b to move toward the nozzle orifice 61, because the area of diaphragm 55 is twice the area of diaphragm 52, and hence a decrease in pressure in chamber 54 causes a net increase in the force acting to move the diaphragm assembly to the left. When the pilot 58b more fully obstructs the nozzle orifice 61, the flow of air from source 33 through line 64, passageway 65 and restriction 66 to the chamber 67 bounded by diaphragm 68a causes an increase in the back pressure of the nozzle 62 and forces the assembly 68 into a position which tends to close valve 72. This action also opens the valve 74, allowing air to flow from line 64 to chamber 70 and thus increasing the pressure in the chamber 21 and moving the diaphragm 19 and nozzle 11 toward the calender roll. When the nozzle reaches the predetermined distance from the stock, the back pressure in chamber 20 returns to substantially its initial value, and the pressure in chamber 21 has increased enough to hold the nozzle assembly in its new position. Since the pressures in chamber 50 and chamber 54 are now substantially balanced, the controller acts to maintain the new output pressure in chamber 21. The system then is in a condition of balance.

When the nozzle 11 is acted upon by the control means as described above, and moves toward the calender roll while seeking its new position of balance, the diaphragm 19 moves toward the wall 15, descreasing the volume of chamber 20. The decrease in volume of the chamber 20 causes a component of pressure increase to be developed in the chamber 20. This component of pressure increase partially nullifies the decrease in back pressure which has occurred, due to the reduced thickness of the stock. The component of pressure increase is directly proportional to the rate of change of volume of the front chamber, that is, proportional to the velocity of the diaphragm 19. Thus the effect of the action is to reduce the actuating force exerted in chamber 54 of the controller by an amount which is proportional to the rate of correction of the position of the nozzle. This constitutes negative velocity feed-back.

In greater detail, the back pressure of the nozzle 11 can be expressed as a function of the flow rate through the nozzle and the distance between the nozzle and the stock surface. The flow rate can be expressed as the sum of the constant flow from the restriction 99 supplying air to the nozzle 11 and the flow due to the rate of change of volume of the chamber 20. The back pressure, therefore, has a component which is a function of the rate of change of volume of the chamber. This component is in opposition to the change in back pressure caused by motion of the stock relative to the nozzle mount, and is proportional to the velocity of the diaphragm and nozzle. When amplified and applied to chamber 21, this component provides negative velocity feed-back. The necessity for, and the functioning of, negative velocity feed-back in obtaining desirable operational characteristics may be explained as follows. To obtain high accuracy and speed of response in the gage in following changes in stock thickness, it is necessary that a small change in the pressure in chamber 20, applied to chamber 54 of the controller, shall result in a much larger change in the pressure in chamber 70, which operates the motor. That is, the controller should have a high amplification factor for speed and accuracy. However, a system with a high amplification factor is inherently unstable, and liable to uncontrolled oscillations, unless damping is present. Frictional damping is undesirable since it reduces the sensitivity. Negative velocity feed-back, when properly adjusted, supplies damping in just the degree required for stability, without reducing the sensitivity. Negative velocity feed-back in effect continuously and practically instantaneously varies the overall amplification factor inversely to the velocity of the nozzle. Thus corrections are made quickly and positively, but without loss of control.

When the thickness of the stock on the calender roll increases, the nozzle 11 moves away from the calender roll and assumes a new position at the predetermined distance from the surface of the stock. This operation is analogous to that previously described and will not be described in detail.

A thickness indicating instrument, such as that of FIGURE 1 or FIGURES 2-5, may be used in a means for automatically controlling the gage of a sheet of a plastic material formed by a machine (for example a calender). One method of applying the instrument of FIGURES 2-5 to this use will be described and discussed with reference to FIGURES 6 and 7.

Figure 6:
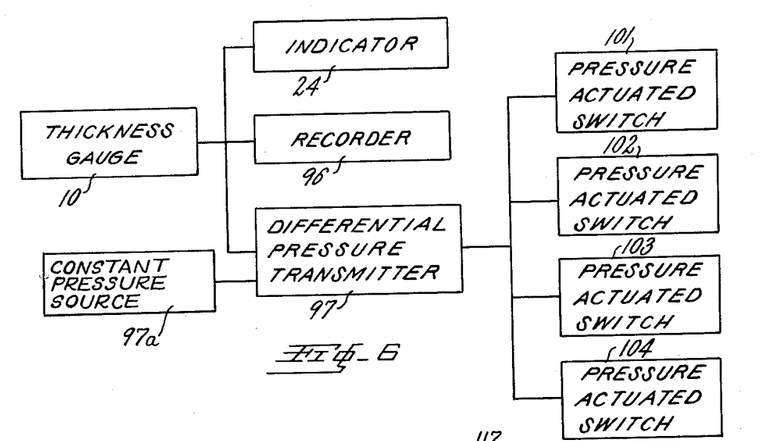
FIGURE 6 is a schematic diagram of a portion of a servomechanism for controlling the gage of a calendered stock utilizing the FIGURE 2 device.

Referring to FIGURE 6 of the drawings, there is represented schematically a portion of a servomechanism for adjusting the nip of the calender rolls to maintain the thickness of the stock substantially constant. The output pressure in chamber 47 of the thickness-indicating device or gage 10 of FIGURE 2 is connected to indicator 24, to a recorder 96 of conventional construction for recording the variations of thickness of the stock, and to a differential pressure transmitter 97 of conventional construction. An adjustable source (97a) of constant pressure equal to the output pressure of the thickness gage corresponding to the desired stock thickness is also connected to the differential pressure transmitter 97, which thus develops an output pressure dependent upon the difference between the two pressures supplied to it, and hence representative of the deviation of the actual stock thickness from the desired stock thickness. The output line of the differential pressure transmitter is connected to four pressure-actuated switches 101, 102, 103, 104 which start and stop the calender roll screw-down motor 116 (shown diagrammatially in FIGURE 7), and which operate and are actuated in a manner to be described presently.

The action of the differential pressure transmitter 97 is such that, when the stock has the desired thickness, the output pressure of 97 has a definite value; and when the stock thickness is greater (or less) than desired, the output pressure of 97 is respectively less (or greater) than this definite value by an amount which is larger, the larger the deviation of the stock thickness. For definiteness in this discussion, the following typical values will be used for the relationship between stock thickness and output pressure of 97:

| Stock thickness deviation (mils) | −2 | −0.75 | 0 | +0.75 | +2 |
|---|---|---|---|---|---|
| Output pressure of 97 (p.s.i.) | 11 | 9.75 | 9 | 8.25 | 7 |

The four pressure-actuated switches are then chosen and adjusted to open and close, when the applied pressure changes, in accordance with the following schedule:

Switch 101—open below 9.75 p.s.i.; closed above 9.75 p.s.i.
Switch 102—open above 8.25 p.s.i.; closed below 8.25 p.s.i.
Switch 103—open below 11 p.s.i.; closed above 11 p.s.i.
Switch 104—open above 7 p.s.i.; closed below 7 p.s.i.

Comparison of this schedule with the output pressure vs. stock thickness relationship will show that for stock thickness deviations of 0.75 mil or less, all the switches are open. For stock thickness deviations between 0.75 and 2 mils, switch 102 only is closed if the deviation is positive, switch 101 only is closed if the deviation is negative. For deviations of more than 2 mils, switches 102 and 104 are closed with positive deviations, switches 101 and 103 with negative deviations. These switches are connected in a circuit shown in FIGURE 7 which operates to energize the screw-down motor 116 in a suitable direction and at a suitable rate to correct the stock thickness.

Figure 7:
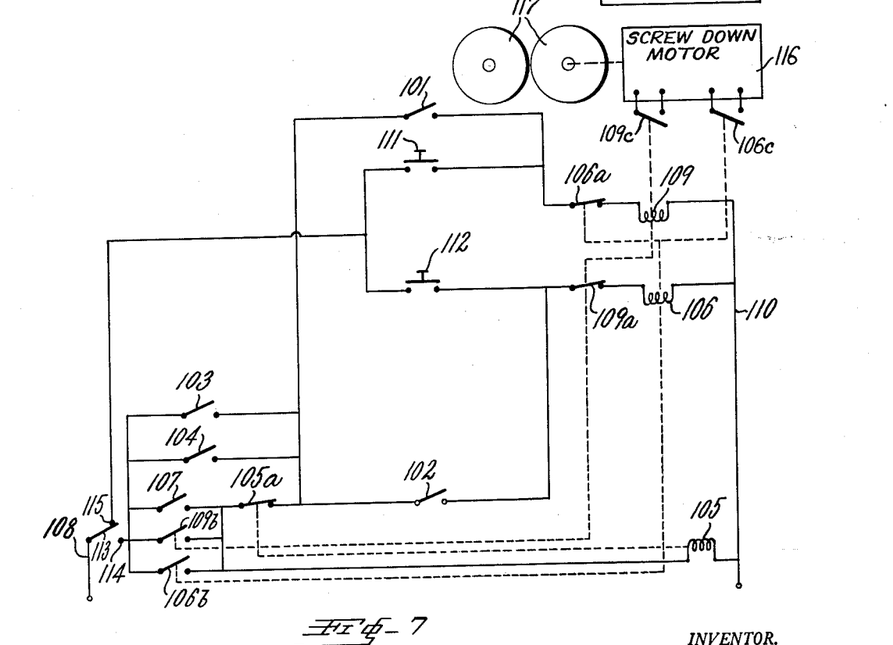
FIGURE 7 is a circuit diagram of the control system utilized in the FIGURE 6 servomechanism.

In FIGURE 7, lines 108 and 110 carry the line voltage; 106 is a relay which, when energized, closes contacts 106c which energize the screw-down motor 116 so as to reduce the spacing of the calender rolls 117; 106 also opens normally closed switch 106a and closes normally open switch 106b. Relay 109, when energized, closes contacts 109c which energize the screw-down motor 116 so as to increase the calender roll spacing; 109 also opens normally closed switch 109a, and closes normally open switch 109b. Switch 107, normally open, is closed for a short time periodically (e.g. once each revolution of the calender roll) by a suitable mechanical arrangement. Switch 105a, normally closed, is opened by time delay relay 105 at a predetermined and adjustable time interval after 105 is energized. Switch 113 connects either the automatic control system at terminal 114 or the manual control system at terminal 115 as desired, and push-button switches 111 and 112 are provided for manual operation of the screw-down motor.

It is evident that the automatic control system functions as follows. If the stock thickness deviation is less than 0.75 mil, switches 101, 102, 103, and 104 are open, and the screw-down motor remains stationary. If the deviation is greater than 2 mils, switches 102 and 104 close for positive deviations, and switches 101 and 103 close for negative deviations, the other two switches in each case remaining open; the screw-down motor operates continuously in the proper direction to correct the deviation. For deviations between 0.75 and 2 mils, either switch 102 (positive deviations) or switch 101 (negative deviations) is closed, the other three pressure-operated switches remaining open. The corresponding relay 106 or 109 is energized only intermittently, when switch 107 momentarily closes, and the relay remains energized (through the holding action of relay 106b or 109b) only until time delay relay 105 opens switch 105a. Thus the screw-down motor operates to correct the deviation only periodically and intermittently, for periods of time determined by the setting of the time delay relay 105. (In the case under discussion, 105 would be set to give about 0.6 mil correction in the stock thickness.) Switches 106a and 109a insure against energizing both relays 106 and 109 at the same time. Switches 106b and 109b energize 105 at the proper time.

The above-described system for calender stock thickness control combines rapid correction of large deviations with freedom from over-shooting and "hunting" in correcting small deviations. Using this system, it has been possible to hold the gage of calendered stock within tolerances of plus or minus 1 mil.

From the foregoing description, it will be apparent that a stock thickness indicating device constructed in accordance with the invention has several advantages. The device is accurate, stable and has good speed of response. It is suitable for use in a servomechanism effective to control the nip of calender rolls to maintain the thickness of the stock substantially constant. A plurality of such gages, for example, one at each end of the calender rolls, may be employed to control a like number of independent adjustments to the calender, for example, separate screw-down action at the two ends.

While applicant does not wish to be limited to any particular set of parameters and operating characteristics, the following have been successfully employed in a stock thickness-indicating gage constructed in accordance with the invention.

Air pressures:
  Supply—50 p.s.i. or higher. Source 33—35–40 p.s.i. (regulated to +0.3%).
  Control pressure source 53—adjustable 3–5 p.s.i. (regulated to +0.3%).
Nozzle orifice: 13 holes, 0.035" diameter, in flat surface 0.250" diameter.
Performance: Range—up to 0.25 inch thickness (range depends upon dimensions and design of the pneumatic motor).
Accuracy: ±0.5% of full range.
  Speed of response—1 inch of nozzle travel per second.
  Stability of operation—excellent.

In comparison with the manual and automatic methods of the prior art for indicating, adjusting, and controlling the gage of calendered sheets, the instrument of the present invention is far superior in accuracy, reliability, and speed of operation, resulting in substantial savings in labor, material, and machine operating time, and improvements in product quality.

As a further example of an application of the device of FIGURE 1, FIGURE 8 shows, in part diagrammatically, a device for indicating or recording the variations in a pneumatic pressure, or by extension the variations in any quantity which can be made, by suitable arrangement to manifest themselves as variations in a pneumatic pressure. The elements of the device, and their mode of operation, correspond closely to those of the FIGURE 1 device; corresponding parts in the two figures are correspondingly identified.

In the FIGURE 8 device, the pressure which it is desired to indicate or record is applied to the controller C' as the reference pressure at the input port A'; the pointer E carrying a pen and connected to the shaft O' of the motor M' is moved over the chart G to record the pressure variations as shown by line L. The motor M' is a pneumatic motor of the type shown in FIGURE 2, having a piston travel great enough to give the requisite range of motion to E. Low mechanical motion magnification may be used in linking M' with E. The tapered rod R attached to the shaft O' and moving in the hole H forms the variable flow resistance $R'_2$. As in the FIGURE 1 device, the pressure in the chamber V' and connecting portions depends upon the value of the variable flow resistance $R'_2$, and so is representative of the position of the pointer E. When the pointer E indicates the value of the pressure at A', the device is in a balanced condition; the pressure at I' corresponds to the input pressure, and the controller C' holds the motor M' stationary. If now the input pressure applied at A' increases, the resulting unbalance in the controller causes the motor to move to the right, thereby increasing the flow resistance $R'_2$, and causing the pressure at I' to increase until balance once more is reached. The change in volume of the chamber V' when the motor moves acts as in the previously described devices to provide negative velocity feedback. Thus the position of the pointer E substantially follows the pressure variations at A' providing an indication and a record thereof. This device is much superior to a simple, direct-acting pressure gage in showing, on a large, easily-read scale, rapid changes of pressure, with a minimum of error due to time lag in response.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

Having thus described my invention, what I claim and desire to protect by Letters Patent is:

1. A servomechanism with negative velocity feedback for positioning a member comprising: a motor adapted to position said member; a controller actuated by a pneumatic pressure representative of the position and velocity of said member and adapted to control said motor so as to maintain the desired position of said member; and means for developing the actuating pressure for said controller comprising a passageway for gas communicating with said controller and having an entrance and an exit, means for introducing gas at the entrance to said passageway at a constant rate of flow, means communicating with said passageway for changing the rate of flow of gas therein by an amount proportional in magnitude to the velocity of said member and in such a sense as to counteract the motion of said member, a variable flow resistance at the exit of said passageway, and means including said motor for varying said variable flow resistance in correspondence with the position of said member.

2. A servomechanism with negative velocity feedback for positioning a member comprising: a motor adapted to position said member; a controller actuated by a pneumatic pressure representative of the position and velocity of said member and adapted to control said motor so as to maintain the desired position of said member; and means for developing the actuating pressure for said controller comprising a passageway for gas communicating with said controller and having an entrance and an exit, a fixed flow resistance at the entrance of said passageway, means for supplying gas from a constant pressure supply through said fixed flow resistance to said passageway, means communicating with said passageway for changing the rate of flow of gas therein by an amount proportional in magnitude to the velocity of said member and in such a sense as to counteract the motion of said member, a variable flow resistance at the exit of said passageway, and means including said motor for varying said variable flow resistance in correspondence with the position of said member.

3. A servomechanism with negative velocity feed-back for positioning a member comprising: a motor adapted to position said member; a controller actuated by a pneumatic pressure representative of the position and velocity of said member and adapted to control said motor so as to maintain the desired position of said member; and means for developing the actuating pressure for said controller comprising a passageway for gas communicating with said controller and having an entrance and an exit, a fixed flow resistance at the entrance of said passageway, means for supplying gas from a constant pressure supply through said fixed flow resistance to said passageway, a chamber communicating with said passageway and having a wall movable with said member for varying the volume of said chamber to change the rate of flow in said passageway by an amount proportional in magnitude to the velocity of said member and in such a sense as to counteract the motion of said member, a variable flow resistance at the exit of said passageway, and means including said motor for varying said variable flow resistance in correspondence with the position of said member.

4. A device for indicating the distance of a material surface from a reference point comprising: a movable nozzle with an orifice adapted to discharge a stream of gas against said material surface to develop within said nozzle a back-pressure of a magnitude dependent upon the distance between said material surface and said orifice and upon the velocity of said nozzle; mounting means, in fixed spatial relationship to said reference point, upon which said nozzle is so mounted as to be movable relative to said material surface; control means actuated by said back-pressure and having an output adapted to reposition said nozzle so as to maintain within said nozzle a substantially constant predetermined back-pressure corresponding to a predetermined distance between said surface and said orifice; and means responsive to the rate of change of position of said nozzle relative to said surface for providing negative velocity feed-back in said device, thereby conferring upon said device desired operational characteristics.

5. A device for indicating variations of position of a material surface comprising: movable means for discharging a gas stream against said material surface to develop within said discharging means a back-pressure of a magnitude dependent upon the distance between said material surface and said discharging means and upon the velocity of said discharging means; means for mounting said discharging means movably relative to said material surface; control means actuated by said back-pressure for repositioning said discharging means so as to maintain a substantially constant predetermined back-pressure within said discharging means, the position of said discharging means thus being representative of the position of said material surface; and means responsive to the rate of change of position of said discharging means for providing negative velocity feed-back in said device, thereby imparting to said device desired operational characteristics.

6. A device for indicating the thickness of moving stock on a calender roll comprising: a movable nozzle with an orifice adapted to discharge a stream of gas against the surface of said stock to develop within said nozzle a back-pressure of a magnitude dependent upon the distance between said surface and said orifice and upon the velocity of said nozzle; mounting means, maintained in a fixed spatial relationship with the surface of said calender roll, upon which said nozzle is so mounted as to be movable relative to said stock surface; control means actuated by said back-pressure and having an output adapted to reposition said nozzle so as to maintain within said nozzle a substantially constant predetermined back-pressure corresponding to a predetermined distance between said stock surface and said orifice; and means responsive to the rate of change of position of said nozzle for providing negative velocity feed-back in said device, thereby conferring upon said device desired operational characteristics.

7. A device for indicating variations of position of a material surface comprising: movable means for discharging a gas stream against said material surface to develop a back-pressure dependent in magnitude upon the distance between said material surface and said discharging means and upon the velocity of said discharging means; means for mounting said discharging means movably relative to said material surface; a pneumatic controller actuated by said back-pressure for developing an output pressure representative of said back-pressure; means actuated by said output pressure of said pneumatic controller for repositioning said discharging means so as to maintain a substantially constant predetermined back-pressure within said discharging means, the position of said discharging means thus being representative of the position of said material surface; and means responsive to the rate of change of position of said discharging means for developing negative velocity feed-back in said device, thereby imparting to said device desired operational characteristics.

8. A device for indicating variations of position of a material surface comprising: movable means for discharging a gas stream against said material surface to develop a back-pressure dependent in magnitude upon the distance between said material surface and said discharging means and upon the velocity of said discharging means; means for mounting said discharging means movably relative to said material surface; a pneumatic controller actuated by said back-pressure for developing an output pressure representative of said back-pressure; a pneumatic motor, actuated by said output pressure of said controller, having a movable member attached to said discharging means for repositioning said discharging means so as to maintain a substantially constant predetermined back-pressure within said discharging means, the position of said discharging means thus being representative of the position of said material surface; and means responsive to the rate of change of position of said discharging means for providing negative velocity feed-back in said device, thereby imparting to said device desired operational characteristics.

9. A device for indicating variations of position of a material surface comprising: movable means for discharging a gas stream against said material surface to develop a back-pressure dependent in magnitude upon the distance between said material surface and said discharging means and upon the velocity of said discharging means; means for mounting said discharging means movably relative to said material surface; a pneumatic controller actuated by said back-pressure for developing an output pressure representative of said back-pressure; a pneumatic motor having a diaphragm attached to said discharging means and actuated by said output pressure of said controller for repositioning said discharging means so as to maintain a substantially constant predetermined back-pressure within said discharging means, the position of said discharging means thus being representative of the position of said material surface; and means comprising a chamber of variable volume, communicating with said discharging means and with said controller and responsive to the velocity of said discharging means for varying the volume of said chamber to develop a component of flow rate through said discharging means proportional to said velocity and in such direction as to provide negative velocity feed-back in the device, thereby imparting to the device desired operational characteristics.

10. A device for indicating the thickness of moving stock on a calender roll comprising: movable means for discharging a stream of gas against the surface of said stock to develop a back-pressure dependent in magnitude upon the distance between said surface of said stock and said discharging means and upon the velocity of said discharging means; means for mounting said discharging means movably relative to said surface of said stock; a pneumatic controller actuated by said back-pressure for developing an output pressure representative of said back-pressure; a pneumatic motor having a diaphragm attached to said discharging means and actuated by said output pressure of said controller for repositioning said discharging means so as to maintain a substantially constant predetermined back-pressure within said discharging means, the position of said discharging means thus being representative of the position of said surface of said stock; means, comprising a chamber of variable volume bounded at one side by said diaphragm and having a volume which varies with displacements of said diaphragm and communicating pneumatically with said nozzle and with said controller, responsive to the velocity of said discharging means for varying the volume of said chamber to develop a component of flow rate through said discharging means proportional to said velocity and in such direction as to provide negative velocity feed-back in the device, thereby imparting to said device desired operational characteristics.

11. A device for indicating the distance of a material surface from a reference point comprising: a movable nozzle with an orifice adapted to discharge a stream of gas against said material surface to develop within said nozzle a back-pressure of a magnitude dependent upon the distance between said material surface and said orifice and upon the velocity of said nozzle; mounting means, in fixed spatial relationship to said reference point, upon which said nozzle is so mounted as to be movable relative to said material surface; control means actuated by said back-pressure and having an output adapted to reposition said nozzle so as to maintain within said nozzle a substantially constant predetermined back-pressure-corresponding to a predetermined distance between said surface and said orifice; means responsive to the rate of change of position of said nozzle relative to said surface for providing negative velocity feed-back in said device, thereby conferring upon said device desired operational characteristics; and means for indicating the position of said nozzle relative to said mounting means, thereby indicating the distance of said material surface from said reference point.

12. A device for indicating the distance of a material surface from a reference point comprising: a movable nozzle with an orifice adapted to discharge a stream of gas against said material surface to develop within said nozzle a back-pressure of a magnitude dependent upon the distance between said material surface and said orifice and upon the velocity of said nozzle; mounting means, in fixed spatial relationship to said reference point, upon which said nozzle is so mounted as to be movable relative to said material surface; control means actuated by said back-pressure and having an output adapted to reposition said nozzle so as to maintain within said nozzle a substantially constant predetermined back-pressure corresponding to a predetermined distance between said surface and said orifice; means responsive to the rate of change of position of said nozzle relative to said surface for providing negative velocity feed-back in said device, thereby conferring upon said device desired operational characteristics; means associated with said nozzle for developing an output pressure representative of the position of said nozzle relative to said mounting means; and pneumatic means responsive to said output pressure for indicating the position of said nozzle relative to said mounting means, thereby indicating the distance of said material surface from said reference point.

13. A servomechanism for positioning a movable member at a predetermined distance from a surface comprising: movable means for discharging a gas stream against said surface to develop within said discharging means a back-pressure dependent in magnitude upon the distance between said surface and said discharging means and upon the velocity of said discharging means; means for mounting said discharging means movably relative to said surface; means for moving said movable member in direct correspondence with the motion of said discharging means; control means actuated by said back-pressure and having an output adapted to reposition said discharging means so as to maintain with said discharging means a substantially constant predetermined back-pressure corresponding to said predetermined distance between said surface and said movable member; and means responsive to the rate of change of position of said discharging means for providing negative velocity feed-back in said servomechanism, thereby conferring upon said servomechanism desired operational characteristics.

14. A servomechanism for positioning a movable member at a predetermined distance from a surface comprising: a movable nozzle having a multiholed flat face for discharging a diffuse stream of gas against said surface without distorting said surface to develop within said nozzle a back-pressure dependent upon the distance between said surface and said nozzle and upon the velocity of said nozzle; means for mounting said nozzle movably relative to said surface; means for moving said movable member in direct correspondence with the motion of said nozzle; control means actuated by said back-pressure and having an output adapted to reposition said nozzle so as to maintain within said nozzle a substantially constant predetermined back-pressure corresponding to said predetermined distance between said surface and said movable member; and means responsive to the rate of change of position of said nozzle for providing negative velocity feed-back in said servomechanism, thereby conferring upon said servomechanism desired operational characteristics.

15. A servomechanism for controlling the position of a surface relative to a reference point comprising: a first portion comprising movable means for discharging a gas stream against said surface to develop within said discharging means a back-pressure dependent in magnitude upon the distance between said surface and said discharging means and upon the velocity of said discharging means; means, in fixed spatial relationship to said reference point, for mounting said discharging means movably relative to said surface; control means actuated by said back-pressure and having an output adapted to reposition said discharging means so as to maintain within said discharging means a substantially constant predetermined back-pressure corresponding to a predetermined distance between said discharging means and said surface; means responsive to the rate of change of position of said discharging means relative to said surface for providing negative velocity feed-back in said first portion; and a second portion comprising means responsive to the position of said discharging means for changing the position of said surface; whereby said servomechanism maintains said surface substantially at a predetermined position relative to said reference point.

16. A servomechaninsm for controlling the position of a surface relative to a reference point comprising: a movable nozzle with an orifice adapted to discharge a stream of gas against said surface to develop within said nozzle a back-pressure of a magnitude dependent upon the distance between said surface and said orifice and upon the velocity of said nozzle; means, in fixed spatial relationship to said reference point, for mounting said nozzle movably relative to said surface; a pneumatic controller actuated by said back-pressure for developing an output pressure representative of said back-pressure; a pneumatic motor having a diaphragm attached to said nozzle and actuated by said output pressure of said controller for repositioning said nozzle so as to maintain within said nozzle a substantially constant predetermined back-pressure corresponding to a predetermined distance between said surface and said nozzle; means, comprising a chamber of variable volume, communicating with said nozzle and with said controller and responsive to the velocity of said nozzle relative to said surface, for varying the volume of said chamber to develop a component of flow rate through said nozzle proportional to said velocity and in such direction as to provide negative velocity feed-back in the servomechanism; and means responsive to the position of said nozzle for changing the position of said surface so as to maintain said surface substantially at a predetermined position relative to said reference point.

17. A device for indicating the thickness of moving stock on a calender roll comprising: a movable nozzle having a multiholed flat face for discharging a diffuse stream of gas against the surface of said stock without distorting said surface to develop within said nozzle a back-pressure dependent upon the distance between said surface and said nozzle and upon the velocity of said nozzle; mounting means, maintained in a fixed spatial relationship with the surface of said calender roll, upon which said nozzle is so mounted as to be movable relative to said stock surface; control means actuated by said back-pressure and having an output adapted to reposition said nozzle so as to maintain within said nozzle a substantially constant predetermined back-pressure corresponding to a predetermined distance between said surface and said nozzle; and means responsive to the rate of change of position of said nozzle relative to said surface for providing negative velocity feed-back in said device, thereby conferring upon said device desired operational characteristics.

18. A device for indicating the thickness of moving stock on a calender roll comprising: a movable nozzle with an orifice adapted to discharge a stream of gas against the surface of said stock and thereby develop within said nozzle a back-pressure of a magnitude dependent upon the distance between said surface of said stock and said orifice and upon the velocity of said nozzle; mounting means, including a member in contact with said calender roll and responsive to movements thereof for maintaining said mounting means in fixed spatial relationship to said calender roll, upon which said nozzle is so mounted as to be movable relative to said surface of said stock; control means actuated by said back-pressure and having an output adapted to reposition said nozzle so as to maintain within said nozzle a substantially constant predetermined back-pressure corresponding to a predetermined distance between said surface and said orifice; and means responsive to the rate of change of position of said nozzle relative to said surface for providing negative velocity feed-back in said device, thereby conferring upon said device desired operational characteristics.

19. A device for indicating the thickness of moving stock on a calender roll comprising: movable means for discharging a stream of gas against the surface of said stock to develop a back-pressure dependent in magnitude upon the distance between said surface of said stock and said discharging means and upon the velocity of said discharging means; means for mounting said discharging means movably relative to said surface of said stock; a pneumatic controller actuated by said back-pressure for developing an output pressure representative of said back-pressure; means actuated by said output pressure of said pneumatic controller for repositioning said discharging means so as to maintain a substantially constant predetermined back-pressure within said discharging means, the position of said discharging means thus being representative of the position of said surface of said stock; and means responsive to the rate of change of position of said discharging means for developing negative velocity feed-back in said device, thereby imparting to said device desired operational characteristics.

20. A device for indicating the thickness of moving stock on a calender roll comprising: movable means for discharging a stream of gas against the surface of said stock to develop a back-pressure dependent in magnitude upon the distance between said surface of said stock and said discharging means and upon the velocity of said discharging means; means for mounting said discharging means movably relative to said surface of said stock; a pneumatic controller actuated by said back-pressure for developing an output pressure representative of said back-pressure; a pneumatic motor, actuated by said output pressure of said controller, having a movable member attached to said discharging means for repositioning said discharging means so as to maintain a substantially constant predetermined back-pressure within said discharging means, the position of said discharging means thus being representative of the position of said surface of said stock; and means responsive to the rate of change of position of said discharging means for providing negative velocity feed-back in said device, thereby imparting to said device desired operational characteristics.

21. A device for indicating the thickness of moving stock on a calender roll comprising: movable means for discharging a stream of gas against the surface of said stock to develop a back-pressure dependent in magnitude upon the distance between said surface of said stock and said discharging means and upon the velocity of said discharging means; means for mounting said discharging means movably relative to said surface of said stock; a pneumatic controller ctuated by said back-pressure for developing an output pressure representative of said back-pressure; a pneumatic motor having a diaphragm attached to said discharging means and actuated by said output pressure of said controller for repositioning said discharging means so as to maintain a substantially contsant predetermined back-pressure within said discharging means, the position of said discharging means thus being representative of the position of said surface of said stock; means, comprising a chamber of variable volume, communicating with said discharging means and with said controller and responsive to the velocity of said discharging means for varying the volume of said chamber to develop a component of flow rate through said discharging means proportional to said velocity and in such direction as to provide negative velocity feed-back in the device, thereby imparting to said device desired operational characteristics.

22. A device for indicating the thickness of moving stock on a calender roll comprising: a movable nozzle with an orifice adapted to discharge a stream of gas against the surface of said stock to develop within said nozzle a back-pressure of a magnitude dependent upon the distance between said surface of said stock and said orifice and upon the velocity of said nozzle; mounting means, in fixed spatial relationship with the surface of said calender roll, upon which said nozzle is so mounted as to be movable relative to said surface of said stock; control means actuated by said back-pressure and having an output adapted to reposition said nozzle so as to maintain within said nozzle a substantially constant predetermined back-presure corresponding to a predetermined distance between said surface and said orifice; means responsive to the rate of change of position of said nozzle relative to said surface for providing negative velocity feed-back in said device, thereby conferring upon said device desired operational characteristics; and means for indicating the position of said nozzle relative to said mounting means, thereby indicating the thickness of said stock.

23. A device for indicating the thickness of moving stock on a calender roll comprising: a movable nozzle with an orifice adapted to discharge a stream of gas against the surface of said stock to develop within said nozzle a back-pressure of a magnitude dependent upon the distance between said surface of said stock and said orifice and upon the velocity of said nozzle; mounting means, in fixed spatial relationship with the surface of said calender roll, upon which said nozzle is so mounted as to be movable relative to said surface of said stock; control means actuated by said back-pressure and having an output adapted to reposition said nozzle so as to maintain within said nozzle a substantially constant predetermined back-pressure corresponding to a predetermined distance between said surface of said stock and said orifice; means responsive to the rate of change of position of said nozzle relative to said surface for providing negative velocity feed-back in said device, thereby conferring upon said device desired operational characteristics; means associated with said nozzle for developing an output pressure representative of the position of said nozzle relative to said mounting means; and pneumatic means responsive to said output pressure for indicating the position of said nozzle relative to said mounting means, thereby indicating the thickness of said stock.

24. A servomechanism for controlling the thickness of stock moving between calender rolls comprising: a first portion comprising movable means for discharging a stream of gas against the surface of said stock to develop within said discharging means a back-pressure dependent in magnitude upon the distance between said surface of said stock and said discharging means and upon the velocity of said discharging means; means, in fixed spatial relationship to the surface of one of said calender rolls, for mounting said discharging means movably relative to said surface; control means actuated by said back-pressure and having an output adapted to reposition said discharging means so as to maintain within said discharging means a substantially constant predetermined back-pressure corresponding to a predetermined distance between said surface of said stock and said discharging means; means responsive to the rate of change of position of said discharging means relative to said surface for providing negative velocity feed-back in said first portion; and a second portion comprising means responsive to the position of said discharging means for adjusting the nip of said calender rolls so as to maintain the thickness of the said stock substantially constant.

25. A servomechanism for controlling the thickness of stock moving between calender rolls comprising: a movable nozzle with an orifice adapted to discharge a stream of gas against the surface of said stock to develop within said nozzle a back-pressure of a magnitude dependent upon the distance between said surface of said stock and said orifice and upon the velocity of said nozzle; means in fixed spatial relationship to the surface of one of said calender rolls for mounting said nozzle movably relative to said surface of said stock; a pneumatic controller actuated by said back-pressure for developing an output pressure representative of said back-pressure; a pneumatic motor having a diaphragm attached to said nozzle and actuated by said output pressure of said controller for repositioning said nozzle so as to maintain within said nozzle a substantially constant predetermined back-pressure corresponding to a predetermined distance between said surface of said stock and said orifice; means, comprising a chamber of variable volume, communicating with said nozzle and with said controller and responsive to the velocity of said nozzle relative to said surface, for varying the volume of said chamber to develop a component of flow rate through said nozzle proportional to said velocity in such direction as to provide negative velocity feed-back in the servomechanism; and means responsive to the position of said nozzle for adjusting the nip of said calender rolls so as to maintain the thickness of the said stock substantially constant.

26. Apparatus for automatically controlling a dimension of a material produced by a machine in continuous lengths comprising: gaging means for developing a pneumatic pressure representative of said dimension of said material; means for supplying a pneumatic pressure representative of the desired value of said dimension; a differential pressure transmitter actuated by said pressures and adapted to furnish an output pressure representative of the deviation of the value of said dimension from said desired value; and means responsive to said output pressure of said differential pressure transmitter adapted to effect an adjustment of said machine and thereby bring said dimension of said material to said desired value.

27. Apparatus for automatically controlling a dimension of a material produced by a machine in continuous lengths comprising: gaging means for developing a pneumatic pressure representative of said dimension of said material; means for supplying a pneumatic pressure representative of the desired value of said dimension; a differential pressure transmitter actuated by said pressures and adapted to furnish an output pressure representative of the deviation of the value of said dimension from said desired value; electrically energized motor means for adjusting said machine to change said dimension of said material; and an electrical circuit comprising a plurality of pressure-operated electrical switches actuated by said output pressure and adapted to energize said motor means in such a sense as to adjust said dimension of said material to said desired value.

28. Apparatus for automatically controlling the gage of sheet stock produced by a calender comprising gaging means adapted to furnish a pneumatic pressure representative of the gage of said stock; means for supplying a constant pneumatic pressure representative of the desired gage of said stock; a differential pressure transmitter actuated by said pressures and adapted to furnish an output pressure representative of the deviation of the actual stock gage from the desired stock gage; electrically energized motor means for opening and closing the nip of the calender rolls; and an electrical circuit, comprising a plurality of pressure-operated switches actuated by said output pressure and adapted to energize said motor means to change the nip separation in such direction and to such extent as to correct for the deviation of the actual stock gage from the desired stock gage, when said deviation exceeds a predetermined amount.

29. Apparatus for automatically controlling the gage of sheet stock produced by a calender comprising gaging means adapted to furnish a pneumatic pressure representative of the gage of said stock; means for supplying a constant pneumatic pressure representative of the desired gage of said stock; a differential pressure transmitter actuated by said pressures and adapted to furnish an output pressure representative of the deviation of the actual stock gage from the desired stock gage; electrically energized motor means for opening and closing the nip of the calender rolls; and an electrical circuit, comprising a first pressure-operated on-off switch, actuated by said output pressure, which is closed only when said output pressure exceeds a predetermined value corresponding to a predetermined deviation of the stock gage in one sense, and a second such switch which is closed only when said output pressure is less than a predetermined value corresponding to a predetermined deviation of the stock gage in the opposite sense, whereby said motor means is energized in such sense and to such extent as to correct said deviation, when it exceeds a predetermined amount.

30. An apparatus as in claim 29 in which said electrical circuit includes a normally closed timer switch designed to open the supply line to said circuit at a predetermined time interval after energization of said motor means, a normally open sampling switch in series with said timer switch, means for momentarily closing said sampling switch at periodic time intervals, and a normally open holding-relay switch shunting said sampling switch.

References Cited in the file of this patent
UNITED STATES PATENTS

| | | |
|---|---|---|
| 1,317,956 | Carlstedt | Oct. 7, 1919 |
| 2,156,895 | Godat | May 2, 1939 |
| 2,244,864 | Witham | June 10, 1941 |
| 2,295,399 | Hanna | Sept. 8, 1942 |
| 2,438,696 | Fox et al. | Mar. 30, 1948 |
| 2,763,278 | Eller et al. | Sept. 18, 1956 |
| 2,838,028 | Erbguth | June 10, 1958 |
| 2,927,455 | Outterson | Mar. 8, 1960 |